(12) United States Patent
Inagaki (10) Patent No.: US 10,238,958 B2
(45) Date of Patent: Mar. 26, 2019

(54) TANGIBLE TRADABLE COLLECTIBLES HAVING A DIGITAL COPY

(71) Applicant: SONY INTERACTIVE ENTERTAINMENT AMERICA LLC, San Mateo, CA (US)

(72) Inventor: Ken Inagaki, Foster City, CA (US)

(73) Assignee: SONY INTERACTIVE ENTERTAINMENT AMERICA LLC, San Mateo, CA (US)

( * ) Notice: Subject to any disclaimer, the term of this patent is extended or adjusted under 35 U.S.C. 154(b) by 262 days.

(21) Appl. No.: 14/729,274

(22) Filed: Jun. 3, 2015

(65) Prior Publication Data

US 2016/0358239 A1    Dec. 8, 2016

(51) Int. Cl.
| | | |
|---|---|---|
| *G06Q 30/00* | (2012.01) | |
| *A63F 13/00* | (2014.01) | |
| *G06Q 30/06* | (2012.01) | |
| *G06F 17/30* | (2006.01) | |
| *A63F 13/65* | (2014.01) | |
| *A63F 13/79* | (2014.01) | |
| *A63F 13/825* | (2014.01) | |

(Continued)

(52) U.S. Cl.
CPC .............. *A63F 13/00* (2013.01); *A63F 13/35* (2014.09); *A63F 13/58* (2014.09); *A63F 13/65* (2014.09); *A63F 13/69* (2014.09); *A63F 13/79* (2014.09); *A63F 13/825* (2014.09); *A63F 13/95* (2014.09); *G06F 17/30312* (2013.01); *G06Q 30/00* (2013.01); *G06Q 30/0208* (2013.01); *G06Q 30/0209* (2013.01); *G06Q 30/0619* (2013.01); *A63F 2300/575* (2013.01); *G06Q 2220/10* (2013.01)

(58) Field of Classification Search
CPC .......... A63F 13/00; A63F 13/10; A63F 13/55; A63F 13/60; A63F 13/45; A63F 13/79; A63F 13/67; A63F 13/71–13/73; G06Q 30/0601–30/0645
USPC ....................................... 705/26.44
See application file for complete search history.

(56) References Cited

U.S. PATENT DOCUMENTS

| | | | | |
|---|---|---|---|---|
| 1,706,622 | A * | 3/1929 | Lingham ................. | G06C 7/10 235/2 |
| 7,862,428 | B2 * | 1/2011 | Borge ..................... | A63F 13/02 463/29 |

(Continued)

OTHER PUBLICATIONS

Tyler T Ochoa, Who Owns an Avatar?: Copyright, Creativity, and Virtual Worlds, Jan. 1, 2012, Faculty Publications at Santa Clara Law, PDF pp. 1-35 (Year: 2012).*

(Continued)

*Primary Examiner* — William J Allen
*Assistant Examiner* — Maria S. P. Heath
(74) *Attorney, Agent, or Firm* — Polsinelli LLP (57) ABSTRACT

Tradable physical collectible objects are described. In particular, systems and methods for using the tradable physical collectible objects facilitate generation of a digital copy that can be used within a network game. A user can use the digital copy and perform various modifications to the digital copy. A value can be determined for the digital copy based on the various modifications. At a later date, the user (e.g., owner) is free to give away, sell or trade the digital copy to another party in transaction with terms based on, for example, the determined value of the digital copy.

20 Claims, 5 Drawing Sheets

(51) Int. Cl.
*A63F 13/58* (2014.01)
*G06Q 30/02* (2012.01)
*A63F 13/35* (2014.01)
*A63F 13/69* (2014.01)
*A63F 13/95* (2014.01)

(56) References Cited

U.S. PATENT DOCUMENTS

| | | | | |
|---|---|---|---|---|
| 2007/0226119 | A1* | 9/2007 | Balser | G06Q 40/04 |
| | | | | 705/37 |
| 2008/0275789 | A1* | 11/2008 | Ganz | A63F 13/12 |
| | | | | 705/76 |
| 2009/0069084 | A1* | 3/2009 | Reece | A63F 13/10 |
| | | | | 463/32 |
| 2011/0028219 | A1* | 2/2011 | Heatherly | A63H 3/28 |
| | | | | 463/42 |
| 2012/0316999 | A1* | 12/2012 | Koh | G06T 19/00 |
| | | | | 705/27.2 |
| 2016/0240037 | A1* | 8/2016 | Robbins | G07F 17/329 |

OTHER PUBLICATIONS

Mark Wallace, The Game is Virtual. The Profit is Real., May 29, 2005, The New York Times, PDF pp. 1-5 (Year: 2005).*

* cited by examiner

TANGIBLE TRADABLE COLLECTIBLES HAVING A DIGITAL COPY

BACKGROUND

Field of Invention

The present invention generally relates collectible objects. More specifically, the present invention relates to systems and methods directed at physical collectible objects that have a corresponding tradable digital copy usable in one or more gaming networks.

Description of the Related Art

A collectible object (also referred to as a collector's item or collectibles) can be an object that has a particular value or interest to a collector. The value may not necessarily be monetary. For example, collectibles may also be desirable for other reasons including its age, beauty, rarity, condition, utility, personal emotional connection or other unique features tied to the collectible (e.g., previous owner).

Within the field of collectibles, there are a variety of different types and terminologies that are used. An antique can be used to refer to a collectible that is old (e.g., paintings, cars, pottery). A curio can be used to refer to a small, usually fascinating or unusual item that can be sought after by collectors (e.g., jewelry, dolls). A manufactured collectible can be used to refer to an item that is made specifically for individuals to collect (e.g., limited edition objects, trading cards).

The concept of ownership of items (e.g., collectibles) also exists in the digital arena (e.g. video games). For example, in some video games (e.g., World of Warcraft, Diablo 3) players can obtain a variety of rare and collectible items including rare weapons, armors, toys, and pets. These rare and collectible items can then be traded or sold to other players within the game via private transactions or through the use of some in-game feature (e.g. public auction house). It should be noted that many of these items may be found solely within the game. In other words, there may not be a physical counterpart for a user to physically collect and own with respect to these in-game collectibles.

Additionally, each instance of a rare or collectible item generated in the video game for one user may be similar to other instances of the same rare or collectible item generated within the video game for a different user. For example, a game may award a special item a player for completing a quest or boss within the video game. The same item, however, can be similarly given to other players for completing the same quest or boss.

There is also very little opportunity presently available in many video games that allows a user to personalize a particular collectible item in order to distinguish one user's collectible from others available in the game. The modifications that are presently available, for example, may include upgrading statistics for weapons and armor through the use of in-game features such as "enchanting" or "jewelcrafting" in World of Warcraft. Such modifications, however, are minimalistic. World of Warcraft, furthermore, may not allow transfer of an item once it has been used by a user (e.g., bind-on-use).

The value associated with each collectible item within the video game (e.g., World of Warcraft) can be based on a variety of factors. Such factors can include the difficultly/rarity in achieving the particular item. For example, if an item is a rare drop (e.g., 1% or less from a particular rare spawn) and/or possesses a unique effect or utility, these factors may increase an overall value of the item.

There may also be many reasons why another player would want to invest in-game resources (or even possibly spend real-world currency) to obtain a particular collectible. Many times, rare items are obtains based off luck or could result from a large amount of time spent in the game looking for the collectible. As an alternative, player may wish to spend resources or money to obtain the rare item because the player may not have the luxury of spending as much time as they would like to obtain the item. Alternatively, the tasks leading up to obtaining the item may be repetitive and/or boring and the user would rather spend money to bypass the process.

There also currently exist physical collectible items that a user can buy and use within a video game. Examples of such collectible items may include Skylanders (from Activision), Disney Infinity and Amiibos (from Nintendo). These products generally include a figure of a character that is represented within the corresponding video game. These figures, furthermore, may themselves be collectible.

The connection between the currently existing physical collectible figures (e.g., Skylanders, Amiibos) with video games may include providing a digital copy of the character in game for a player to use. For example, in Nintendo's Smash Brothers 4, Nintendo released a variety of figures that were capable of interacting with a variety of video games. An Amiibo, with the corresponding hardware (e.g., Wii U) can allow data to be transferred in and out of games using near field communications (NFC). In the case for Smash Brothers 4, the characters already exist in the game but can be modified by the user through the use of different color schemes, upgraded statistics and some artificial intelligence in the way the character would behave in game based on how the user "trained" the character. The "training" is stored in the respective Amiibo owned by a particular user.

Similarly, in Skylanders, a user can use the collectible figures in connection to a videogame. However, for Skylanders, a user "unlocks" a particular character by purchasing the physical copy of the character from a store and using the collectible in connection with the "Portal of Power", an interface that uses radio-frequency identification (RFID) so that the video game can obtain information from the physical collectible.

It should be noted that some customization may be provided in Nintendo's Amiibos with respect to the "training" previously discussed. In contrast, other implementations (e.g., Skylanders) may not utilize any customization at all but may merely allow the user to "unlock" the character to be used within the video game.

Furthermore, there may not be a system whereby a user can associate their digital copy within the game and continue using it without the need to keep the physical object. Each time the user wishes to utilize the information, the physical collectible may need to be in the user's presence and used in conjunction with additional peripherals (e.g., The Portal of Power, the controller of the Wii U). As an extreme situation, the user can "lose" the data tied to the physical collectible if the user misplaces/loses the physical collectible. This situation may occur since the data associated with the physical collectible may not be stored in the game or on a network.

Additionally, there does not appear to exist a way in which a user can sell or trade the data corresponding to the physical collectible to others in an easy manner. Presently, such sales or trades would need to be performed physically (e.g., in person) since the physical collectible needs to transfer possession from one party to another so that, for example, the buyer can actually use the character (or the data associated with the character) in connection with a peripheral corresponding to a desired video game.

SUMMARY OF THE CLAIMED INVENTION

A system for a tradable physical collectible object is claimed. The system includes the tradable physical collectible object that has a unique identification code used to generate a digital copy that is usable in an associated network game. A user is capable of interacting with the digital copy through use of a client device that is communicatively connected with a game network associated with the network game. The game network or network game can assign ownership of the digital copy to the user. Ownership of the digital copy can be transferred from one user to another.

A method for using tradable physical collectible objects is claimed. The method includes providing a tradable physical collectible object that has a unique identification code used to generate a digital copy that is usable in an associated network game. A user is capable of interacting with the digital copy through use of a client device that is communicatively connected with a game network associated with the network game. The game network or network game can assign ownership of the digital copy to the user. Ownership of the digital copy can be transferred from one user to another.

DETAILED DESCRIPTION

The present disclosure describes tradable physical collectible objects that have a corresponding digital copy that can be used in one or more network games associated with various gaming networks. The digital copy can be customized by the user in a variety of different ways associated with associated network games. The collectability of the tradable physical collectible object and corresponding digital copy as well as implemented customization by the user provides a value associated with the object and/or digital copy. This value can later be used by the user to sell or trade the object and/or digital copy to other users via existing services provided by, for example, the manufacturer of the tradable physical collectible object or network game.

Figure 1:
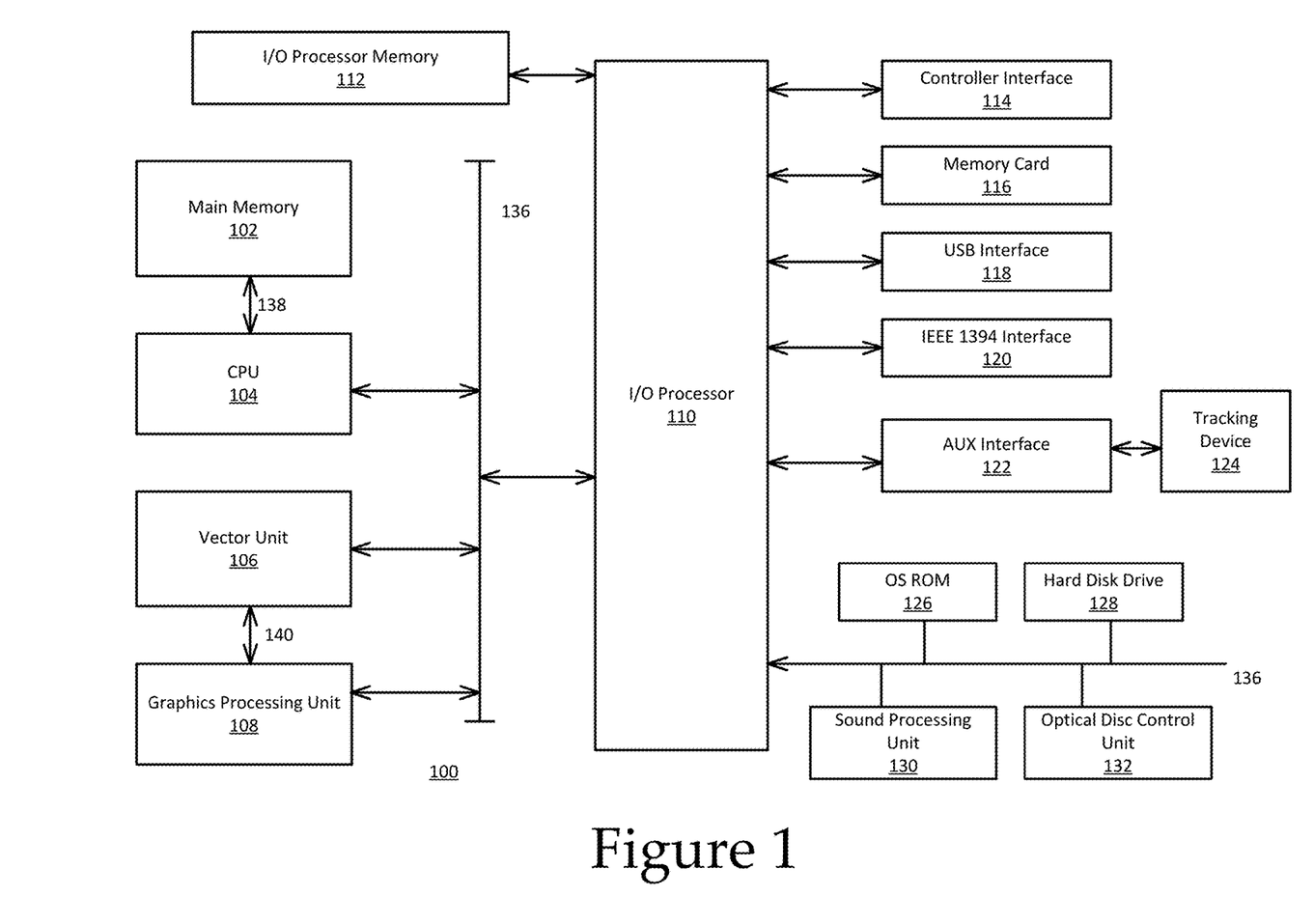
FIG. 1 is a block diagram of an exemplary electronic entertainment system.

FIG. 1 is a block diagram of an exemplary electronic entertainment system 100. The exemplary electronic entertainment system 100 may be incorporated into a user client device (e.g., desktop, laptop, tablet, mobile device, console gaming system) that the user can utilize to facilitate carrying out features of the present invention pertaining to the tangible tradable collectibles.

The entertainment system 100 may include various elements as illustrated in FIG. 1. It should be noted that the elements are exemplary and that other embodiments may incorporate more or less than the elements illustrated. With reference to FIG. 1, the entertainment system 100 includes a main memory 102, a central processing unit (CPU) 104, at least one vector unit 106, a graphics processing unit 108, an input/output (I/O) processor 110, an I/O processor memory 112, a controller interface 114, a memory card 116, a Universal Serial Bus (USB) interface 118, and an IEEE 1394 interface 120, an auxiliary (AUX) interface 122 for connecting a tracking device 124, although other bus standards and interfaces may be utilized. The entertainment system 100 further includes an operating system read-only memory (OS ROM) 126, a sound processing unit 130, an optical disc control unit 132, and a hard disc drive 128, which are connected via a bus 134 to the I/O processor 110. The entertainment system 100 further includes at least one tracking device 124.

The tracking device 124 may be a camera, which includes eye-tracking capabilities. The camera may be integrated into or attached as a peripheral device to entertainment system 100. In typical eye-tracking devices, infrared non-collimated light is reflected from the eye and sensed by a camera or optical sensor. The information is then analyzed to extract eye rotation from changes in reflections. Camera-based trackers focus on one or both eyes and record their movement as the viewer looks at some type of stimulus. Camera-based eye trackers use the center of the pupil and light to create corneal reflections (CRs). The vector between the pupil center and the CR can be used to compute the point of regard on surface or the gaze direction. A simple calibration procedure of the viewer is usually needed before using the eye tracker.

Alternatively, more sensitive trackers use reflections from the front of the cornea and that back of the lens of the eye as features to track over time. Even more sensitive trackers image features from inside the eye, including retinal blood vessels, and follow these features as the eye rotates.

Most eye tracking devices use a sampling rate of at least 30 Hz, although 50/60 Hz is most common. Some tracking devises run as high as 1250 Hz, which is needed to capture detail of very rapid eye movement.

A range camera may instead be used with the present invention to capture gestures made by the user and is capable of facial recognition. A range camera is typically used to capture and interpret specific gestures, which allows a hands-free control of an entertainment system. This technology may use an infrared projector, a camera, a depth sensor, and a microchip to track the movement of objects and individuals in three dimension. This system employs a variant of image-based three-dimensional reconstruction.

The tracking device 124 may include a microphone integrated into or attached as a peripheral device to entertainment system 100 that captures voice data. The microphone may conduct acoustic source localization and/or ambient noise suppression.

Alternatively, tracking device 124 may be the controller of the entertainment system. The controller may use a combination of built-in accelerometers and infrared detection to sense its position in 3D space when pointed at the LEDs in a sensor nearby, attached to, or integrated into the console of the entertainment system. This design allows users to control a game with physical gestures as well as button-presses. The controller connects to the console using wireless technology that allows data exchange over short distances (e.g., 30 feet). The controller may additionally include a "rumble" feature (i.e., a shaking of the controller during certain points in the game) and/or an internal speaker.

The controller may additionally or alternatively be designed to capture biometric readings using sensors in the remote to record data including, for example, skin moisture, heart rhythm, and muscle movement.

As noted above, the entertainment system 100 may be an electronic gaming console. Alternatively, the entertainment system 100 may be implemented as a general-purpose computer, a set-top box, or a hand-held gaming device. Further, similar entertainment systems may contain more or less operating components.

The CPU 104, the vector unit 106, the graphics processing unit 108, and the I/O processor 110 communicate via a system bus 136. Further, the CPU 104 communicates with the main memory 102 via a dedicated bus 138, while the vector unit 106 and the graphics processing unit 108 may communicate through a dedicated bus 140. The CPU 104 executes programs stored in the OS ROM 126 and the main memory 102. The main memory 102 may contain pre-stored programs and programs transferred through the I/O Processor 110 from a CD-ROM, DVD-ROM, or other optical disc (not shown) using the optical disc control unit 132. The I/O processor 110 primarily controls data exchanges between the various devices of the entertainment system 100 including the CPU 104, the vector unit 106, the graphics processing unit 108, and the controller interface 114.

The graphics processing unit 108 executes graphics instructions received from the CPU 104 and the vector unit 106 to produce images for display on a display device (not shown). For example, the vector unit 106 may transform objects from three-dimensional coordinates to two-dimensional coordinates, and send the two-dimensional coordinates to the graphics processing unit 108. Furthermore, the sound processing unit 130 executes instructions to produce sound signals that are outputted to an audio device such as speakers (not shown).

A user of the entertainment system 100 provides instructions via the controller interface 114 to the CPU 104. For example, the user may instruct the CPU 104 to store certain game information on the memory card 116 or instruct a character in a game to perform some specified action.

Other devices may be connected to the entertainment system 100 via the USB interface 118, the IEEE 1394 interface 120, and the AUX interface 122. Specifically, a tracking device 124, including a camera or a sensor may be connected to the entertainment system 100 via the AUX interface 122, while a controller may be connected via the USB interface 118.

Figure 2:
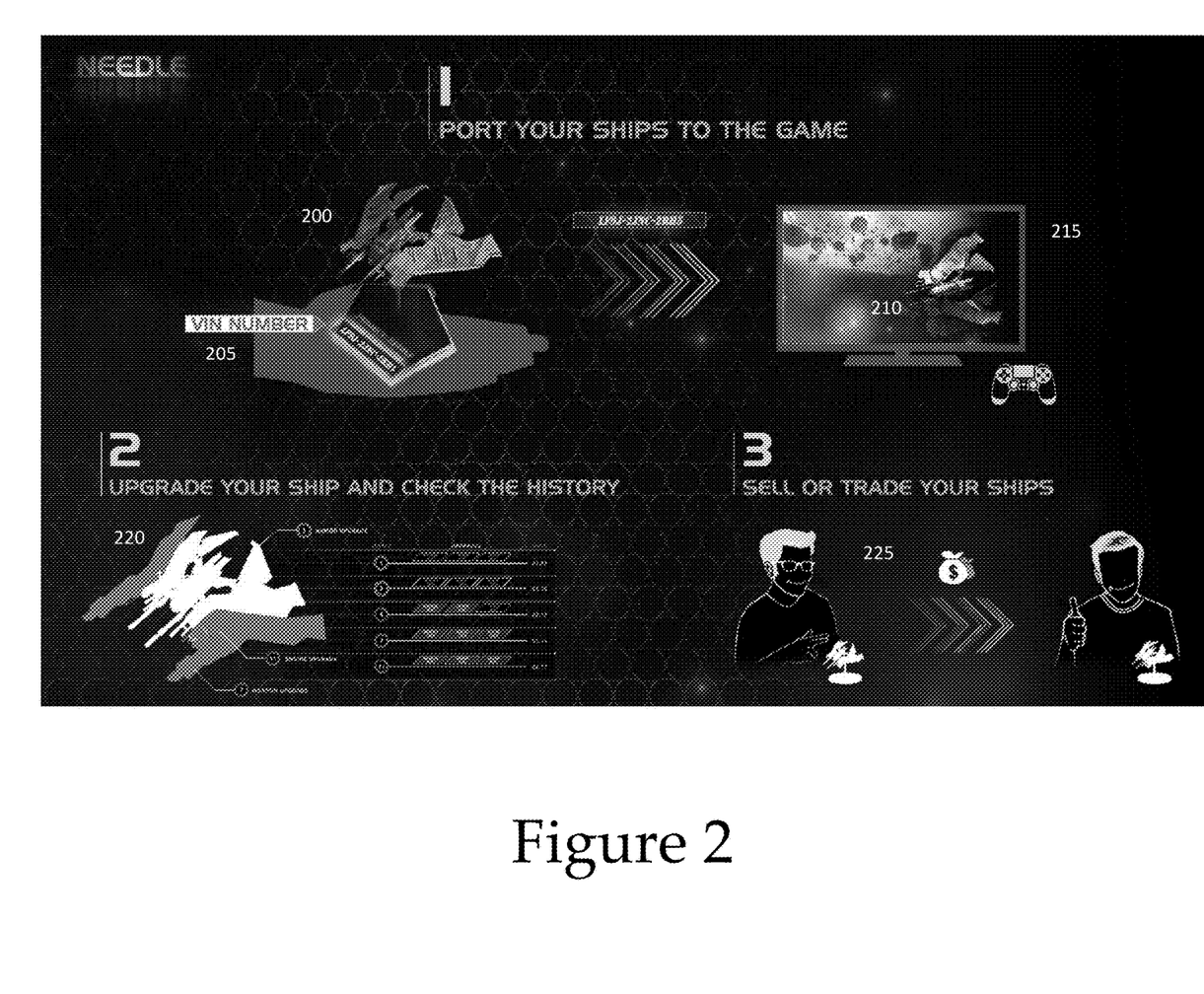
FIG. 2 illustrates an exemplary overall scenario where the tradable physical collectible object is used.

FIG. 2 illustrates an exemplary overall scenario where the tradable physical collectible object is used. Generally, the tradable physical collectible object has a corresponding digital copy usable in one or more network games. The tradable physical collectible object and/or the digital copy can be given away, sold or traded for by the current owner. It should be noted that when the term "collectible object" is used herein, it makes reference to an object (e.g., either a physical object or a digital representation of the object) that an individual can acquire (and own) that may be deemed to have a particular value. The value may be defined by the owner or by others. Ownership of the collectible object can also be subsequently transferred to others.

As noted above, FIG. 2 illustrates an example of how a tradable physical collectible object 200 of the present disclosure may be used. As illustrated in FIG. 2, the tradable physical collectible object 200 is an exemplary space ship that can be used in a corresponding network game 215. The tradable physical collectible object 200 has an unique identification code (e.g., barcode, VIN number) 205 that is used to generate a digital copy 210 of the tradable physical collectible object 200 usable with the network game 215. Further details illustrating a process of incorporating the tradable physical collectible object 200 into the network game 215 (i.e. generating the digital copy for use in the network game 215) are provided below.

It should be noted that the corresponding network game 215 can be any game designed for use with the tradable physical collectible object 200. For example the network games 215 can be a free-to-play (FTP) game that can be downloaded over the Internet. The network game 215 may also be a video game that can be connected to a corresponding network compatible with the tradable physical collectible object 200. The tradable physical collectible object 200 may also vary based on the associated network game 215. Although the example (as illustrated in FIG. 2) of the tradable physical collectible object 200 is a spaceship, it would be within the teachings of the present disclosure to have other tradable physical collectible object 200 of varying other subject matter based on their associated network game 215 (e.g., humanoid figures, physical objects, cars).

The tradable physical collectible object 200 can be viewed as being collectible for a variety of reasons including being limited in production, aesthetic desirability, and utility. For example, the manufacturer of the tradable physical collectible object 200 may limit production of the particular tradable physical collectible object 200 to a small quantity such that the tradable physical collectible object 200 may be hard to acquire (e.g., only 1000 manufactured). The tradable physical collectible object 200 may also have aesthetic desirability for a potential buyer based on an unique design and corresponding artwork tied to the tradable physical collectible object. With reference to utility, the tradable physical collectible object may have its parameters associated with a particular network game 215 improved over other general characteristics (e.g., tied to a desirable object such as a unique ship or above average powered ship). Each of these examples may affect the value (e.g., monetary) of the tradable physical collectible object. This value may be defined by the users (e.g., players) of the network game or by the manufacturer (e.g., retail price).

Once the digital copy 210 of the tradable physical collectible object 200 is within the network game 215, the user playing the network game 215 can interact with the digital copy 210. In the example illustrated in FIG. 2, such interaction may include the user using the digital copy of the ship 210 in a corresponding network game 215. As noted above, other types of video games and tradable physical collectible object can be possible based on the description described herein.

At least with the example illustrated in FIG. 2, example use of the digital copy of the ship 210 includes the ability to implement one or more modifications that can be performed on the digital copy. The modifications may include the ability of the user to upgrade and customize the aesthetic look of the ship 220. These interactions can be aimed at making the digital copy 210 unique to the user where other similar ships may also exist in the same network game 215.

In some network games, when the user invests their time and skill, the user may obtain resources (e.g., experience, in-game currency, game-specific modifications) that can be used to upgrade and customize the digital copy. Upgrades can generally be referenced to modifications to the ship that can improve the utility of the ship in the network game. Generally, this may be associated with parameters of the ship including the durability, speed, and firepower of the ship. Upgrades may also incorporate various special abilities that the ship may not originally have that can help the user play the associated network game.

Customization of the ship can generally be referenced to modifications that change an aesthetic image of the ship. Customizations may include ability for the user to change, for example, the color scheme and design of the ship. These modifications may be provided through customizable color pallets or through pre-defined "skins" (i.e., pre-defined designs that a user can select usable with a particular object).

It should be noted that there may be many more ways modify a particular digital copy not described herein. These alternative methods to modify the digital copy would still allow the user to similarly make the ship unique compared to other ships that may exist in the same network game. Over time, the user can acquire many opportunities to use and modify the ship. Generally this can mean that the ship has gained a lot of improvements and uniqueness compared to the original form of the ship when it was first bought. Hence, at least from the perspective of the owner, value can be assigned based on the time, skill and effort that were placed into modifying the digital copy.

The concept of modifications can also be applied to other types of digital collectible objects not limited to ships as described in FIG. 2. Different types of digital collectible objects may still have their in-game utility (e.g., parameters) adjustable as well as have their aesthetic appearance customizable in similar ways. The exact details on how other digital collectible objects may be based on their associated network game design and how the manufacturer may wish to implement the digital copy.

All the use and modifications to a digital copy of a tradable physical collectible object can be assigned a value (e.g., monetary). The value may be assigned by the user or by others (e.g., potential buyer). It may be possible that the value of the digital copy can be provided via the network game. There can be many factors in associating a value to the digital copy. Such factors may include the time spent and sentimental value. Other factors may also be used by one or more parties in determining the value of the tradable physical collectible object and/or digital copy of the tradable physical collectible object. Once a value has been assigned or agreed upon, the user may choose to give away, sell or trade their collectible object to the other user. It should be noted that the aspects of the tradable collectible object (physical or the digital copy) can be given away, sold or traded separately or in conjunction. For example the user may decide to sell the digital copy to another user playing the network game but keep the physical collectible object.

As described above, the resources may be obtained in game that can be used to modify the digital copy that can subsequently improve the value of the digital copy. It should be noted that other alternatives are possible in providing the user with resources to upgrade their digital copy. For example, it may be possible that real-world currency (e.g., U.S. dollars) may be used to provide the user with resources and/or upgrades that can be utilized on the digital copy. In fact, the use of real-world currency may allow the user to access unique or special upgrades not achievable in the network game using in-game resources. Alternatively, resources may also be provided by third-parties (e.g., manufacturer) through the use of special codes. These resources provided by third-parties may be provided based on some special promotion and can also include unique or special upgrades not achievable in the network game. The use of these alternative resources (e.g., money, promotional codes) may possess a higher than normal associated value that can similarly affect the value of the digital object.

There may be a multitude of various other features that can be tied to data for a particular digital copy that would be covered by the present invention. For example, a history can be associated with each digital copy. The history can include a list of all owners who previously owned the digital copy, locations of the owners or where the digital copy has traveled within the network game, significant activities or events performed by the user using the particular digital copy, or a story associated with the digital copy. The history may be implemented such that future owners can view a timeline of events for the digital copy.

Such implementation of ownership history can also incentivize trades and sales by providing bonuses to users (both past and present). For example, past users may still be able to view the current events tied to the ship (e.g., what the ship has recently completed or what it looks like). As that ship is being used by a current owner, past owners may obtain a partial bonus (e.g., in-game resources) or be awarded with unique rewards associated with being a "past" owner of that same ship. Other bonuses or rewards can be implemented by manufacturers of the tradable physical collectible object and/or network games to further incentivize trades/sales between multiple players.

Also seen in FIG. 2 is an ability for the original user of the physical collectible object to sell or trade their physical collectible object 225. Further explained below in FIG. 5, it is possible for two individuals to transfer ownership of one or more tradable physical collectible object and/or the digital copy of the respective one or more tradable physical collectible object to other users. Generally, these transfers are performed where one party exchanges the tradable physical collectible object and/or the digital copy of the tradable physical collectible object for something of similar value (e.g., money).

Figure 3:
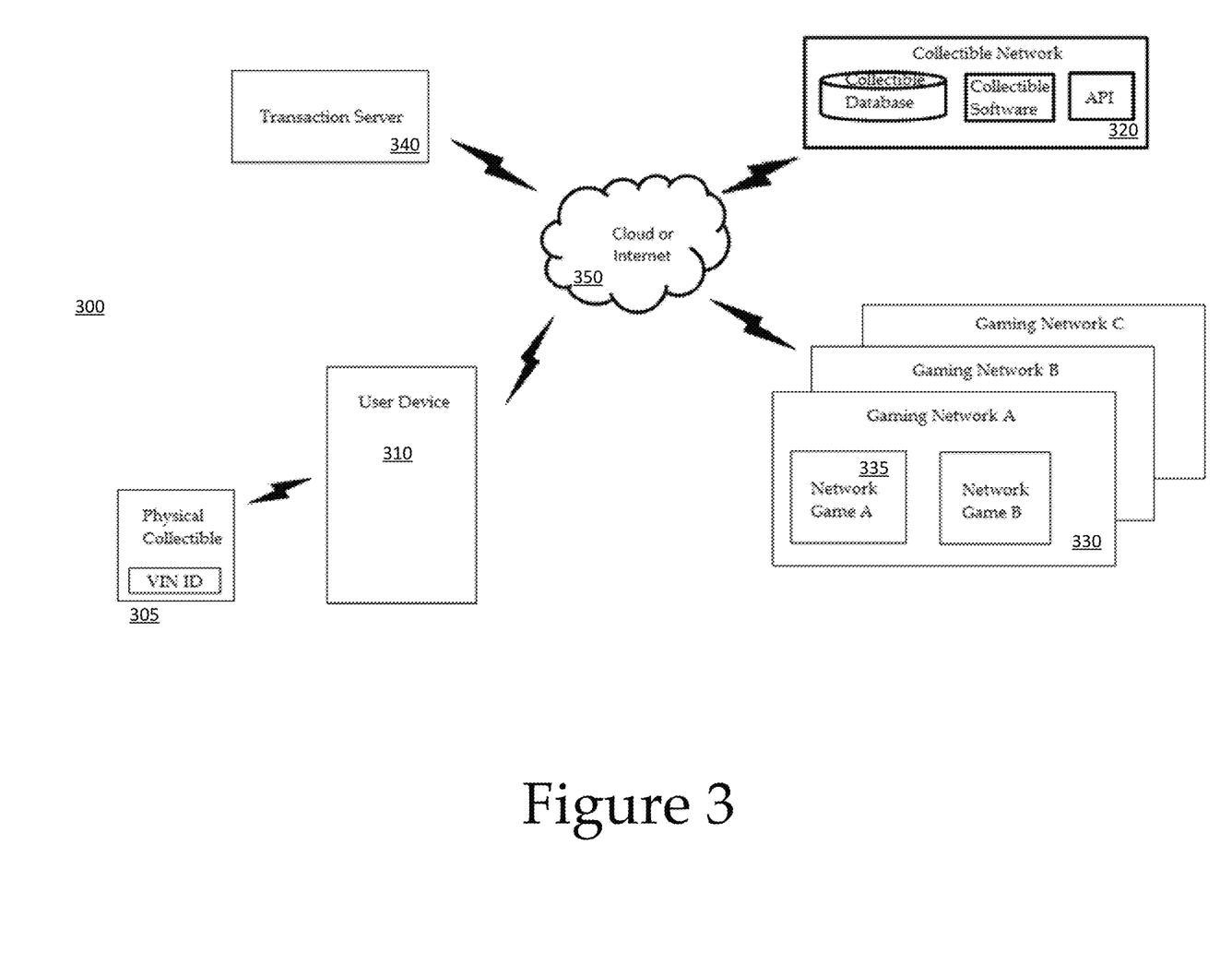
FIG. 3 illustrates an exemplary system for tradable physical collectible objects.

FIG. 3 illustrates an exemplary system for tradable physical collectible objects. The system 300 includes client devices 310, a collectibles database 320, gaming networks 330 and a transaction server 340. The elements of the system 300 may be connected to each other via the cloud or Internet 350.

The client devices 310 may be associated, for example, with the exemplary electronic entertainment systems described above in FIG. 1. Generally, these client devices 310 are devices whereby a user (e.g., player) can use their tradable physical collectible object 305 that they own. The user may connect to a particular network game 335 found on a gaming network 330 via the client device 310. The client device 310 may contain ways to process information about the tradable physical collectible object 305 so that a digital copy can be generated for use in the gaming network 330. For example, the client device 310 may contain a scanner to obtain a barcode identification associated with the physical collectible object. The client device 310 may also utilize a graphical user interface that allows the user to enter information about the physical collectible object. This information can then be sent to the gaming network 330.

The collectible database 320 may be a database that stores information that can be used to generate digital copies associated with a particular tradable physical collectible object. The collectible database 320 may be managed, for example, by a manufacturer of the tradable physical collectible object. Alternatively, an entity associated with the network game that the digital copies are used within may manage the data about the digital copies in the collectible database 320. As new tradable physical collectible object are created, the collectible database may be modified to incorporate information for generating new digital copies for the new physical collectible objects via the application programming interface (API).

When the information about a particular physical collectible object is sent to the gaming network 330 from the client 310, the network game associated with the gaming network 330 may reach out to the collectible database 320 to obtain information stored in the database to generate the digital copy. The collectible database 320, via the collectible software, may process the identification (e.g., the barcode or VIN number) to generate a particular model used for the digital copy. For example, a single code may be used to generate a particular aspect of the digital copy (e.g., the hull of the ship). A full set of codes, combined, may generate the entirety of a digital copy of the ship.

The generated digital copy can then be stored within the gaming network 330. The particular digital copy can be assigned to the user/player. As described later, the digital copy can be assigned to the account of the user/player via a PIN. In this way, the digital copy needs only to be generated once and any updated data for the digital copy can be associated with the digital copy associated with the account of the user/player. Subsequent modifications performed to the digital copy can also be stored within the gaming network or, in some cases, the particular network game. In this way, whenever the user/player wishes to use the digital copy, information can be readily obtained by the network game.

In some embodiments, the collectible database may store a unique instance within the database that the gaming network, via the collectible software, can obtain by using the corresponding identification (e.g., barcode or VIN). In this embodiment, the gaming network may receive the digital copy from the collectible database and subsequently store the obtained digital copy from the collectible database into memory associated with the gaming network or network game. Use of the digital copy (e.g., modifications) can be similar as described above.

It may also be possible that the information about the digital copy (e.g., upgrades, customization) may be subsequently stored in the collectible database. This may be carried out by associating the particular digital copy stored in the collectible database with, for example a pointer that can be referenced to indicate where the digital copy is stored. The gaming network and/or network game, however, may need to contact the collectible database each time the user wishes to use the digital copy within the network game so that the most up-to-date information is used. The ownership information for the digital copy stored in the collectible database may be stored in the gaming network. Information (e.g., pointers) used to identify which digital copy stored in the collectible database belongs to the user would be associated in the account of the user/player who owns the digital copy.

As noted above, the system 300 may include a plurality of different gaming networks 330. Each of the different gaming networks 330 may include one or more network games 335. The gaming network 330 and/or included network games 335 may include a corresponding processor used to process information about the tradable physical collectible object. The gaming network 330 and/or network game 335 may receive identification information (e.g., barcode or VIN) used to identify a possible digital copy stored in the collectible database or request that the collectible database generate a digital copy.

The generated digital copy can then be stored in memory associated with the gaming network 330 and/or network game 335. Data associated with the digital copy may also be stored in the memory associated with the gaming network 330 and/or network game 335. As noted above, example information associated with the digital copy (e.g., resources obtained by the user, upgrades, customization, ownership) may be stored in the memory associated with the gaming network 330 and/or network game. In other embodiments, such example information may be stored in the collectible database to be obtained by the gaming network 330 and/or network game whenever the user/player requests the information. In this case, the memory associated with the gaming network 330 and/or network game 335 would instead store identification information indicating where the digital copy is stored in the collectible database and that the corresponding digital copy is owned by the user/player.

The transaction server 340 can be used to facilitate the transfer of ownership of the digital copy from one user (e.g., owner/seller) to another (e.g., buyer). A graphical user interface (GUI) may connect two or more users and provide relevant information pertaining to the digital copy so that the users (e.g., seller/buyer) can determine a possible value for the digital copy. In some embodiments, the information may be used by the transaction server 340 to generate a suggested value for the users associated with the transaction. The GUI may also allow each of the users to provide additional information that may be beneficial in determining a value. The graphical user interface may also allow each of the users to input a proposed value that can be adjusted, accepted or denied by the other party to the transaction.

Once a value has been agreed upon, the transaction server 340 can be used to transfer ownership of the digital copy from the original owner to the new owner (e.g., buyer). For example, the transaction server 340 may be capable of generating new codes associated with the digital copy so that the new owner (e.g., buyer) can have the digital copy be assigned to their user account associated with the gaming network and/or network game. Assigning ownership of the digital copy to the new owner subsequently removes ownership rights from the original owner (e.g., seller). The transaction server 340 may perform various processes to remove the ownership rights of the original owner (e.g., deleting associated ownership data from memory of the gaming network and/or network game, removing data from the account of the original owner).

Included in the transaction between the original owner and the new owner may be a corresponding transaction fee. The transaction server 340 may inform the users in the transaction that such a fee exists (e.g., via the graphical user interface). The transaction fee may be obtained via the transaction server 340 from one or both the parties involved. For example, a fee (e.g., $1) may be obtained from the seller (e.g., deduction from the profits obtained from the transaction) upon completion of a successful transaction. A fee (e.g., $1) may also be added to the final sale price of the digital copy for the buyer. In any case, the transaction fee may be implemented as a way for the manufacturer of the physical collectible object and/or network game to monetize another aspect of the collectible object. The amount of the fee may be customizable based on the wishes of the manufacturer of the collectible object and/or network game. It may be high enough that the amounts gathered are significant but low enough to encourage frequent transactions. In some cases, the manufacturer of the collectible object and/or network game may decide not to charge any transaction fees.

The use of the transaction server 340 can facilitate a secure way for two users to transact (e.g., buy/sell/trade) a digital copy of a collectible object. Although details provided above are directed towards a buy/sell situation, it is also possible that digital copies can be traded between two players. Values can be assigned to each of the digital copies by the transaction server 340. Any differences between the values can be reimbursed by the respective user. For example, if user A has a collectible object worth $25 and user B has a collectible object worth $20, a trade can occur if user B pays user A the deficit between the values of the two collectible objects (e.g., $5). With trades, the transaction server 340 may require that each of the users pay a transaction fee (e.g., $1) to complete the trade. Ownership information pertaining to each of the digital copies of the collectible object can then be modified in a similar manner as described above.

Figure 4:
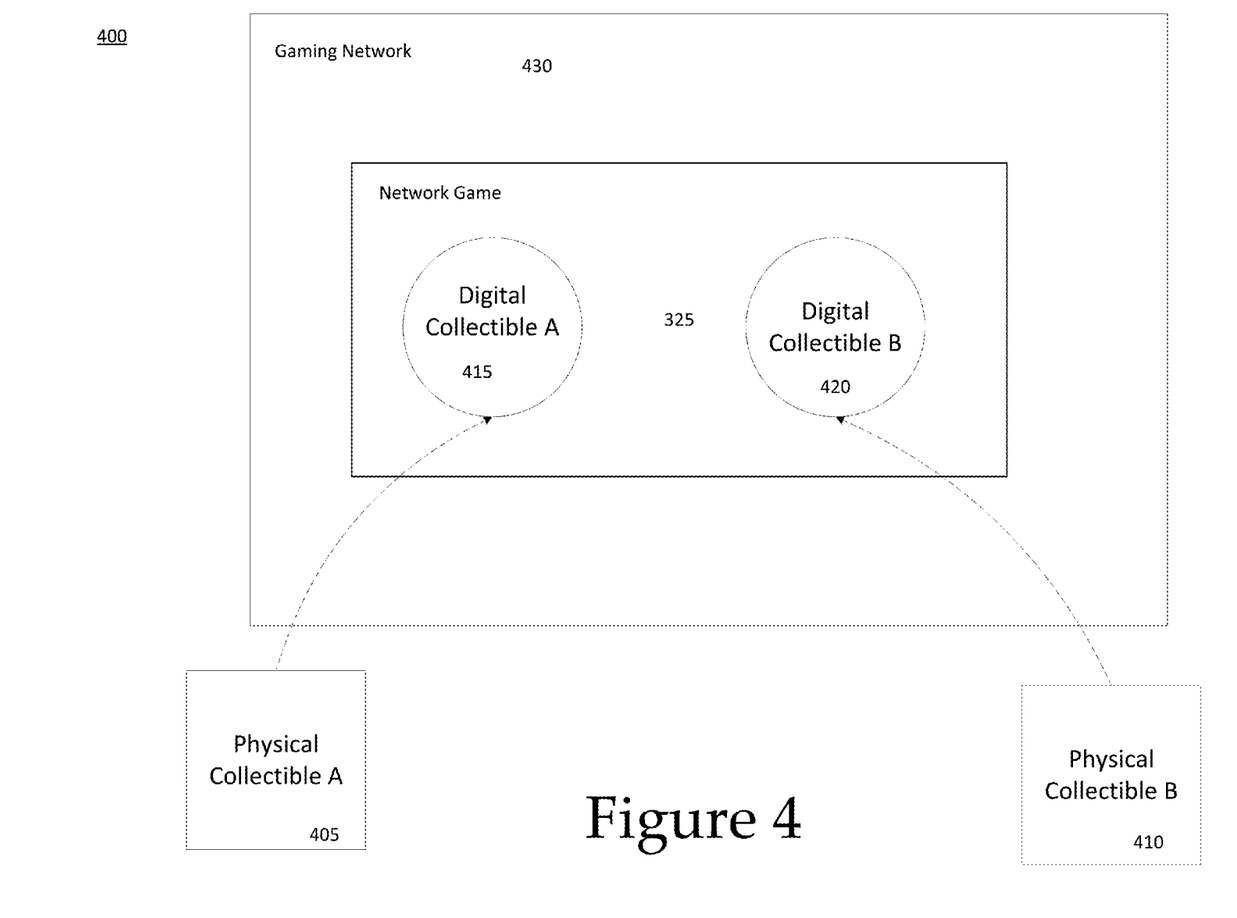
FIG. 4 illustrates an embodiment of two different tradable physical collectible objects as applied in a gaming network.

FIG. 4 illustrates an embodiment of two different tradable physical collectible objects as applied in a gaming network. As described above, a manufacturer may make and sell many tradable physical collectible objects in the real-world. These tradable physical collectible objects may be duplicates of one another (corresponding to a production line of a particular collectible) or distinct with respect to each other (corresponding to different types of tradable physical collectible objects). In any case, these tradable physical collectible objects can be used by a plurality of different users within one or more network games available on a gaming network. As illustrated in FIG. 4, each tradable physical collectible object 405, 410 can have a corresponding digital copy 415, 420 used within a network game 425. In an embodiment of the present disclosure, the digital copies 415, 420 of the tradable physical collectible objects 405, 410 are used within the same network game 425. It should be noted that there may be many different network games and gaming networks 430 available that can be compatible with the tradable physical collectible object 405, 410. Furthermore, the tradable physical collectible object may be usable in one or more network games and gaming networks. In other words, the same tradable physical collectible object may be usable in multiple network games over multiple gaming networks. The tradable physical collectible objects may generate new digital copies to be used with each associated network game or utilize the same digital copy in each network game (i.e. data about the digital copy is carried over/compatible with each network game). Even though FIG. 4 illustrates an embodiment where two different tradable physical collectible objects are used within the same network game, there may be many more possible tradable physical collectible objects usable. The limit associated with a network game may be tied with the available storage associated with the network game as information about each digital copy is stored and processed via the network game.

As described above in the present application, a way in which each digital copy of the tradable physical collectible object can be made unique and personal to a particular user within the network game can be the application of upgrades and customizations. As the particular user invests time within the network game, upgrades and customizations can be applied to the digital copy that can personalize the digital copy and differentiate it from others within the same network game.

Figure 5:
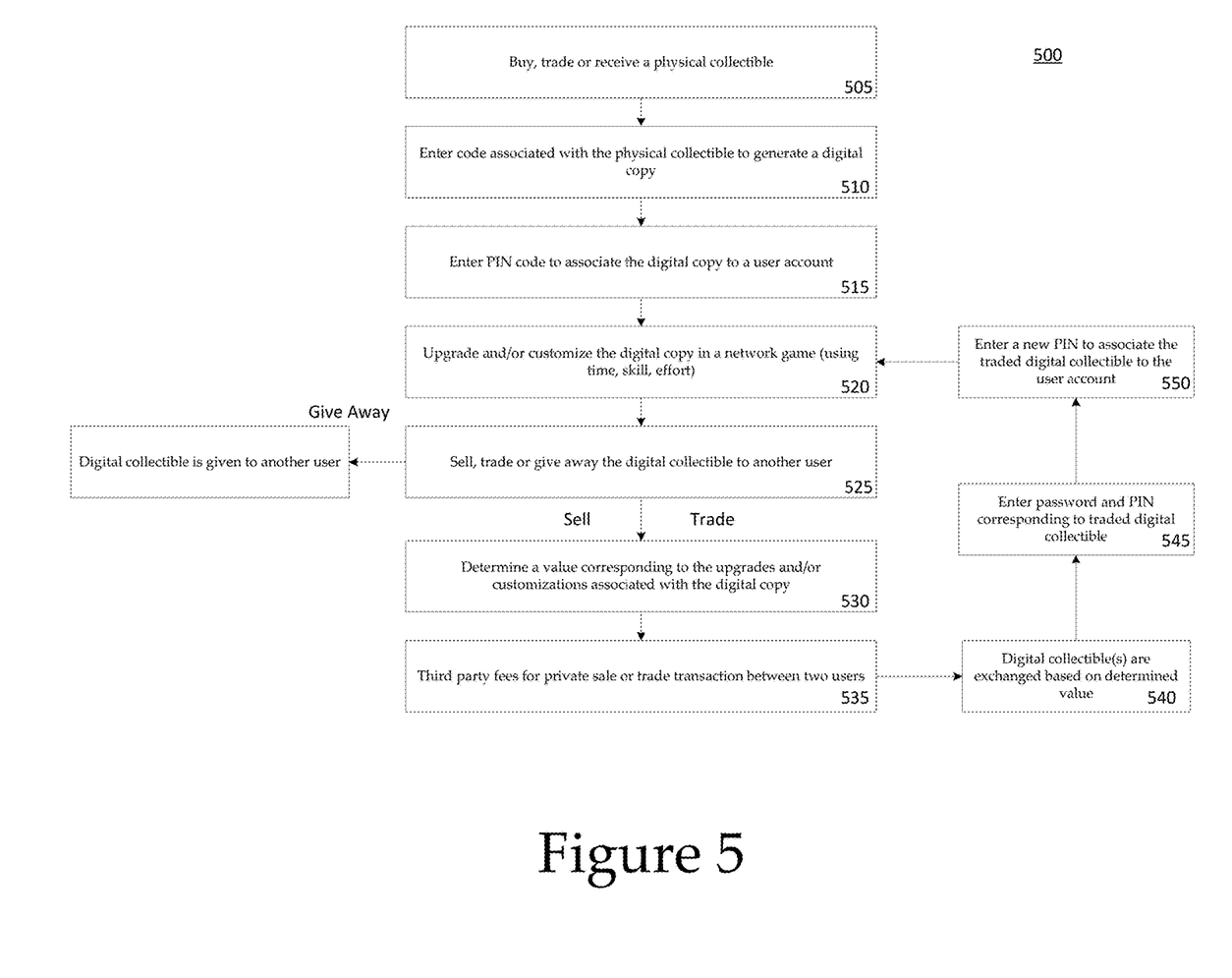
FIG. 5 is a flowchart illustrating an exemplary method of using a tradable physical collectible object having a digital copy within a network game.

FIG. 5 is a flowchart illustrating an exemplary progression of how a physical collectible having a digital copy usable within a network game as described herein is utilized. In particular, the flowchart 500 can illustrate how a user uses the particular physical collectible/digital copy of the physical collectible in embodiments according to the present invention. It should be noted that the steps illustrated in FIG. 5 are based on an embodiment of the present invention. The steps, as shown in FIG. 5, may be utilized in a different order or may be omitted in other embodiments.

Starting with step 505, a user can obtain a copy of the physical collectible. The user can obtain the copy in a variety of ways. The physical collectible can be sold, for example, by a retailer or a manufacturer. The physical collectible may also be given away by the same retailer or manufacturer during a special event or promotion. In any case, these physical collectibles would contain a unique identification code that can be used to generate a digital copy that is usable within a corresponding network game.

It should be noted that the physical collectible may also include information that the user can utilize to obtain the corresponding network game. In some situations, the corresponding network game may be a free-to-play network game and the information may include a hyperlink or website where the user can download the network game. An advantage of associating such information with the physical collectable is to further facilitate an ease for the user to begin playing the network game.

The concept of a tradable physical collectible object that can be used within a network game can also be used to leverage a consumer's uneasiness that can arise surrounding paying for an object that does not physically exist (e.g., exists only in digital form). In other words, an individual may be hesitant to spend money on digital objects only usable within a network game. By providing a tradable physical collectible object, the object itself can be marketed as having a value that may be worth to the user to spend money on.

In step 510, the user can begin the process of using the digital copy of the tradable physical collectible object within the network game. As stated above, each tradable physical collectible object may have a unique identification code located on the object. This code can be used to generate a unique digital copy of the tradable physical collectible object within the network game. For example, the user may enter the unique identification code through a website associated with the network game or enter the identification code directly within the network game itself. It should be noted that other types of identification may be possible. For example, the use of barcodes or quick response (QR) codes can also be used as well in conjunction with a barcode reader or scanner. In any case, data specific to the tradable physical collectible object is obtained from the information and is then used to generate a physical copy for the user to use.

After generating a digital copy of the tradable physical collectible object within a network game, the user can then be prompted to associate the digital copy to the user account in step 515. The association can be performed by the user entering a secondary password (e.g., a personal identification number or PIN). The secondary password can be entered in a similar manner as the unique identification code used to generate the digital copy (e.g., network game website or within the network game). The association can generally be seen as assigning an ownership title of the digital copy to a particular user or user account. In this way, other third parties may not have access to that digital copy.

For example, if the same identification code was used by another individual in an attempt to generate another copy of the tradable physical collectible object within a network game, a message can be provided indicating that the identification code just entered has been already redeemed. This can prevent the same tradable physical collectible object from being a source for generating multiple digital copies of the tradable physical collectible object. If the tradable physical collectible object is supposed to be limited in number, this feature can maintain the uniqueness of the digital copy found within the game.

Another benefit that can arise from the use of the identification code associated with the tradable physical collectible object and a secondary password in assigning ownership to a particular user/user account is to reduce the need for the tradable physical collectible object after the generation of the digital copy. In other words, the data corresponding to the digital copy is stored, for example, in the network game or on the gaming network. The user may not need the tradable physical collectible object in the future to use the digital copy within the game. In this way, if the user loses the tradable physical collectible object, the data associated with the tradable physical collectible object is not lost.

A further benefit may be to minimize the motivation and/or opportunities for theft. In situations where the digital copy of the tradable physical collectible object becomes extremely valuable for one or more reasons (e.g., rare upgrades and/or customizations), in the previous iterations (e.g., Skylanders, Amiibos), it may be possible that the digital copy of the tradable physical collectible object can be stolen when the tradable physical collectible object is stolen. Since the data, however, is associated with the network game or on the gaming network with the particular user account, not only can the user still use the data even after losing the tradable physical collectible object, but the third party who is now in possession of the tradable physical collectible object is unable to use the identification code to generate a digital copy as similarly described above. The third party may be provided a message that the identification code for the particular tradable physical collectible object has already been redeemed.

In step 520, the digital copy of the tradable physical collectible object can now be used within the game. Once the digital copy has been generated within the game, the user can then proceed to use and modify the digital copy as allowed for within the game parameters.

As in the embodiment illustrated in FIG. 2, this may include the user using the particular ship in missions and battles as intended by the particular network game. As the ship is used within the game, the user may obtain resources to modify the ship in many different ways.

As described above, there may be various network games where the user can provide modifications (e.g., upgrades or customizations) to the digital copy. The modifications can be achieved as the user invests time, effort and skill within the network game. The modifications can be obtained through the use of in-game resources or by payment of real-world currency (e.g., U.S. dollars). All these modifications may produce some value.

In step 525, a decision may arise with the user that could encourage the user to look into giving, trading or selling the tradable physical collectible object and/or digital copy of the tradable physical collectible object. It should be noted that the user can choose to sell the tradable physical collectible object or the digital copy of the tradable physical collectible object separately or together. In some cases, the user may only be interested in the digital copy or the tradable physical collectible object. In this case, the user may choose to sell the other aspect of the present invention (e.g., the tradable physical collectible object or the digital copy). In an embodiment where the digital copy is being transferred to another individual, the user may be required to provide the unique identification code associated with the tradable physical collectible object so that the other individual can access the digital copy in the network game.

There may be many reasons why the user would wish to transfer ownership of the tradable physical collectible object and/or digital copy of the tradable physical collectible object to another individual. For example, the user may not wish to play the associated network game anymore and would like to recoup some value from the time spent in the game in acquiring the various modifications. In the past, such data may be "lost" for "forfeit" if the user does not do anything with the data. If the user, for example, stores the object away and never touches it again, the value associated with the time and effort spent on modifying the object within the game can be deemed lost.

Another possibility is that newer tradable physical collectible objects may be introduced in the future and the user would like to transfer ownership of their current digital copy for a digital copy of a different tradable physical collectible object. In the embodiment as illustrated in FIG. 2, this could correspond to a situation where a new ship is being offered by a retailer, and the user would like to exchange his current ship for the newer and different model.

There may be many reasons why another individual would seek to acquire the digital copy of the tradable physical collectible object from a previous owner/user. For example, some individuals may be more comfortable spending real-world currency to obtain a modified digital copy instead of starting from the beginning in order to avoid spending time within the game. In some cases, the time spent in game can be long and arduous in order to achieve the amount of resources necessary to modify a digital copy. By paying another individual for their copy that already has some time and effort spent, the buyer, for example, can bypass some of the time spent in the initial stages of the development of the digital copy and continue where the previous owner left off.

There may be many other reasons that a user could have for transferring their ownership to another individual or for another individual to seek to obtain ownership from the original user. In any case, the present invention provides a way in which such a transfer between the user and another individual can be facilitated more easily.

It may be possible that the user would like to transfer ownership of the tradable physical collectible object and/or digital copy of the tradable physical collectible object to another individual. In situations where the user seeks nothing in exchange for the tradable physical collectible object and/or digital copy, the user can provide the associated identification code and secondary password associating the digital copy to the user account to the other individual. The other individual may then utilize the identification code and secondary password to request a transfer of the data from the original user account to the individual's account. This transfer request may be performed using the network game website and/or within the network game itself. The other individual, who may now be considered the new owner of the digital copy, can then be prompted to enter a new secondary password to associate the digital copy to their user account.

In another situation where the user wishes to perform a sale/trade of the tradable physical collectible object and/or the digital copy based on a perceived value of the tradable physical collectible object and/or the digital copy, the user and the interested buyer/trader may need to determine a reasonable value to assign. This can be seen in step 530. As noted above, value for a collectible can be determined any number of different ways. In an embodiment of the present disclosure, it may be possible that a website or in-game application may provide a suggested value based on the modifications present.

When the user wishes to proceed with the trade/sale of the tradable physical collectible object and/or the digital copy to another individual, the manufacturer of the tradable physical collectible object and/or the manufacturer of the network game may provide an avenue to facilitate the transfer. For example, with the digital copy, a transaction server may allow such transfers to occur through the use of a website or within the network game.

The transaction server may facilitate a secure way in which two individuals can exchange information and/or money for the desired objects (e.g., physical and/or digital copy). However, use of the transaction server to facilitate the transfer of ownership may incur a fee for use of the services of the website and/or network game by one or both parties involved. This can be seen in step 535. The fee may be used to maintain and monitor the workings of the transfer system. There may be other reasons that a fee can be introduced during the transaction. The fee may also be used as a way for the manufacturer to obtain future revenue post sale of the tradable physical collectible object. There may also be embodiments where no fees are charged.

Once the transaction (e.g., step 535) has been completed via the transaction server, depending on whether the digital copy is being sold or traded, the transaction server can run the appropriate processes/steps to begin associating the digital copy or copies being exchanged to their new respective owner step 540. If the digital copy is being sold from one user to a buyer, the seller receives the agreed upon value for the digital copy from the buyer. If digital copies between two users are being exchanged, one user may receive additional value if there exists any deficit (e.g., where one digital copy is valued less than another digital copy).

Once the value and/or exchange of the one or more digital copies are performed, the transaction server may then provide each of the users who are being assigned ownership of the traded digital copies new codes (e.g., PIN, passwords) that can be used to associate the digital copy to the user account of the new owner step 545. This step allows the transaction server to carry out the association on a "final" or permanent basis so that the original owner no longer has direct access or ownership of the digital copy. In other words, information about the digital copy is being removed from the original owner (e.g., seller) and is instead provided to the new owner (e.g., buyer).

The new owner (e.g., buyer) can finalize the exchange process by using the newly assigned code with their user account to associate the obtained digital copy to their user account step 550. This is similar to step 515 in that the new owner becomes the current owner of the digital copy.

Once ownership has been established, the new owner is free to utilize, modify, and further transact the digital copy as they would like. In this way, the digital copy may be used, modified and become subject of a transaction over numerous different users over a period of time.

In situations where the user trades for a different tradable physical collectible object with an unredeemed identification code or for a digital copy of an already redeemed tradable physical collectible object, the user may be prompted to enter the traded for identification code and the original owner's secondary password in order to obtain access to the new digital copy. The user may then be prompted to enter a new secondary password to associate the new digital copy to the user account.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed:

1. A system for transforming a physical object for use within a digital environment, the system comprising:
   a physical object that is associated with a unique identification code;
   a graphics processing unit that generates a digital copy of the physical object based on an associated set of codes, wherein the generated digital copy is presented within the digital environment of a network game and assigned to a player of the network game, the player associated with the unique identification code;
   a client device that connects to the digital environment of the network game in which the digital copy is presented, wherein the client device receives customization input from the player selecting one or more modifications to the digital copy, wherein each modification is associated with a corresponding value;
   a collectible database that stores:
     the associated set of codes,
     information regarding an account associated with the player, wherein the player account includes the unique identification code associated with the physical object and the digital copy as modified in accordance with the player customization input, and
     an ownership history of the digital copy, wherein the ownership history is associated with a reward that is assigned to the player after the digital copy is subsequently transferred to a different player;
   a network game server comprising a communication interface that subsequently receives the unique identification code over a communication network; and
   a processor that executes instructions stored in memory to:
     retrieve the modified digital copy from the collectible database based on the unique identification code,
     provide the retrieved digital copy for inclusion in the network game, wherein the digital copy is tradable to other users within the network game based on a total value of the modifications selected for the digital copy, and
     assign the reward to the player in accordance with the ownership history after the digital copy is subsequently transferred to the different player.

2. The system of claim 1, wherein the processor executes a transaction involving the retrieved digital copy, wherein the transaction further includes verification of a transaction fee payment.

3. The system of claim 1, wherein the modification to the digital copy is performed using in-game or third-party resources.

4. The system of claim 3, wherein the in-game or third-party resources include experience, in-game currency, monetary purchases, or promotional codes.

5. The system of claim 1, wherein the modification to the digital copy includes upgrades to parameters associated with the digital copy in the network game.

6. The system of claim 1, wherein the modification to the digital copy includes customizations to an aesthetic appearance of the digital copy within the network game.

7. A method for transforming a physical object for use within a digital environment, the method comprising:
associating a physical object with a unique identification code;
generating a digital copy of the physical object based on an associated set of codes stored in a collectible database, wherein the generated digital copy is presented within the digital environment of a network game and assigned to a player of the network game, the player associated with the unique identification code;
connecting to the digital environment of the network game in which the digital copy is presented via a client device, wherein the client device receives input from the player selecting one or more modifications to the digital copy, wherein each modification is associated with a corresponding value;
storing information regarding an account associated with the player and an ownership history of the digital copy, wherein the player account includes the unique identification code associated with the physical object and the digital copy as modified in accordance with the player customization input, and wherein the ownership history is associated with a reward that is assigned to the player after the digital copy is subsequently transferred to a different player;
receiving the unique identification code over a communication network;
retrieving the modified digital copy from the collectible database based on the unique identification code;
providing the retrieved digital copy for inclusion in the network game, wherein the digital copy is tradable to other users within the network game based on a total value of the modifications selected for the digital copy; and
assigning the reward to the player in accordance with the ownership history after the digital copy is subsequently transferred to the different player.

8. The method of claim 7, further comprising executing a transaction involving the retrieved digital copy, wherein executing the transaction includes verification of a transaction fee payment.

9. The method of claim 7, wherein the modification to the digital copy is performed using in-game or third-party resources.

10. The method of claim 7, wherein the in-game or third-party resources include experience, in-game currency, monetary purchases, or promotional codes.

11. The method of claim 7, wherein the modification to the digital copy includes upgrades to parameters associated with the digital copy in the network game.

12. The method of claim 7, wherein the modification to the digital copy includes customizations to an aesthetic appearance of the digital copy within the network game.

13. The method of claim 11, wherein the upgraded parameters include at least one of durability, speed, firepower, or predefined new abilities within the network game.

14. The method of claim 12, wherein the customization to the aesthetic appearance of the digital copy includes application of at least one of a custom color palette or a predefined skin.

15. The method of claim 7, wherein the history comprises at least one of a listing of previous owners, locations of previous owners, locations within the network game to which the digital copy has traveled, events within the network game involving the digital copy, activities within the network game involving the digital copy, and a story associated with the digital copy.

16. The method of claim 15, further comprising generating a display of a timeline of the events within the network game involving the digital copy.

17. The method of claim 7, further comprising transferring ownership of the digital copy to a new owner; and generating at least one new code to be associated with the digital copy and a player account of the new owner.

18. The method of claim 7, wherein the modification to the digital copy is associated with one or more other codes, wherein generating an entirety of the modified digital copy is based on a set of codes comprising at least the other codes.

19. The method of claim 7, wherein the client device presents the digital copy for interaction within the digital environment of the network game by the player via at least one of controller commands or gestures.

20. A non-transitory computer-readable storage medium, having embodied thereon a program executable by a processor to perform a method for transforming a physical object for use within a digital environment, comprising:
associating a physical object with a unique identification code;
generating a digital copy of the physical object based on an associated set of codes stored in a collectible database, wherein the generated digital copy is presented within the digital environment of a network game and assigned to a player of the network game, the player associated with the unique identification code;
connecting to the digital environment of the network game in which the digital copy is presented via a client device, wherein the client device receives input from the player selecting one or more modifications to the digital copy, wherein each modification is associated with a corresponding value;
storing information regarding an account associated with the player and an ownership history of the digital copy, wherein the player account includes the unique identification code associated with the physical object and the digital copy as modified in accordance with the player customization input, and wherein the ownership history is associated with a reward that is assigned to the player after the digital copy is subsequently transferred to a different player;
receiving the unique identification code over a communication network;
retrieving the modified digital copy from the collectible database based on the unique identification code;
providing the retrieved digital copy for inclusion in the network game, wherein the digital copy is tradable to other users within the network game based on a total value of the modifications selected for the digital copy; and
assigning the reward to the player in accordance with the ownership history after the digital copy is subsequently transferred to the different player.

* * * * *